Aug. 25, 1925.  
H. P. EDWARDS  
SELF PROPELLED VEHICLE  
Filed Sept. 27, 1924  
1,551,092  
3 Sheets-Sheet 1
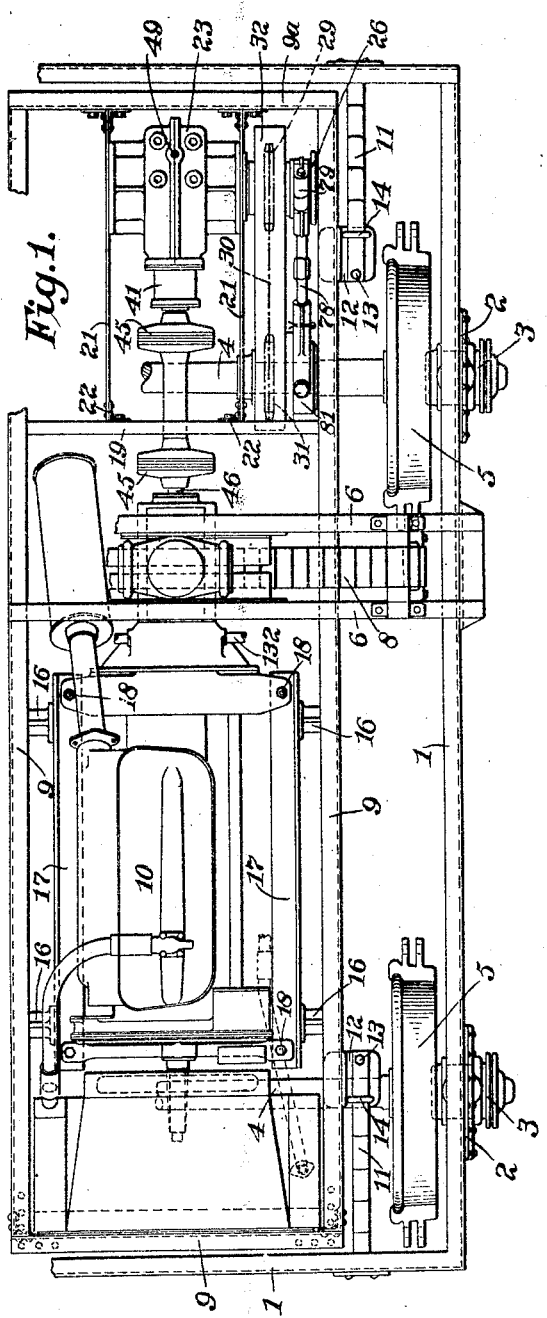
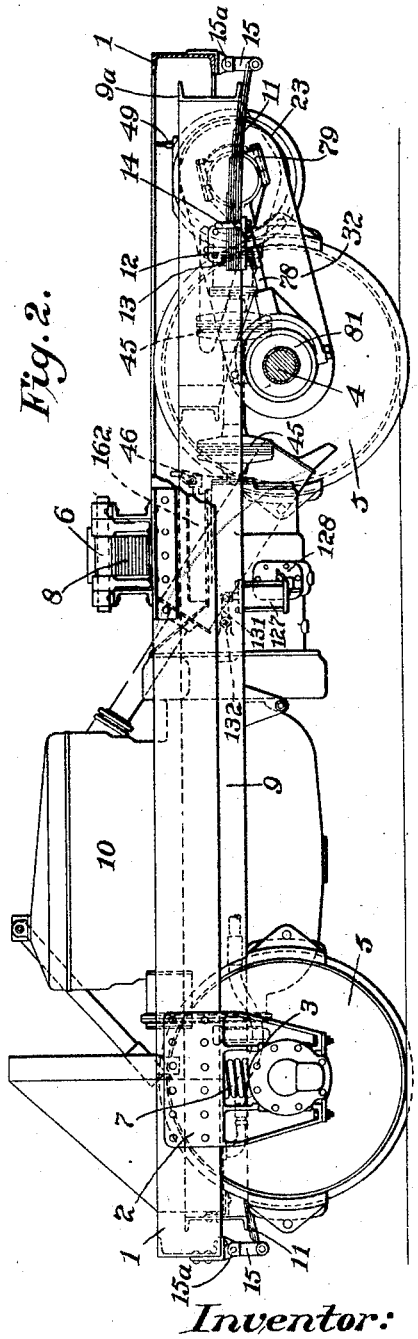
Inventor:  
Harry P. Edwards,  
by Spear, Middleton, Donaldson & Hull  
Attys.

Aug. 25, 1925.

H. P. EDWARDS 1,551,092

SELF PROPELLED VEHICLE

Filed Sept. 27, 1924     3 Sheets-Sheet 2

Inventor:
Harry P. Edwards,

Aug. 25, 1925.

H. P. EDWARDS

SELF PROPELLED VEHICLE

Filed Sept. 27, 1924

Inventor:
Harry P. Edwards,
by Spear, Middleton, Donaldson & Hull
Attys.

Patented Aug. 25, 1925.

1,551,092

UNITED STATES PATENT OFFICE.

HARRY POWELL EDWARDS, OF SANFORD, NORTH CAROLINA.

SELF-PROPELLED VEHICLE.

Application filed September 27, 1924. Serial No. 740,354.

*To all whom it may concern:*

Be it known that I, HARRY P. EDWARDS, a citizen of the United States, and a resident of Sanford, in the county of Lee and State of North Carolina, have invented certain new and useful Improvements in Self-Propelled Vehicles, of which the following is a specification.

My present invention relates to a gasoline-driven locomotive or railway car.

The principal object of the invention is the provision of means whereby the power plant will be included in a truck containing the wheels of the car, so that in case of break-down or repair, the body of the car may be jacked up, the truck removed therefrom, and another power plant substituted.

Another important object is an arrangement of parts whereby the engine comprising the power plant is mounted within the main frame carrying the bolsters which support the car body in such a manner that no shocks are transmitted to the engine, but said shocks are absorbed by springs or resilient members between the wheels and the engine or the engine frame.

Still another important object of the invention is the provision in a railway car of two sets of trucks, as above described, each containing a power plant, the controls therefor extending to the driver's seat, by manipulation of which controls the driver may operate both or either of the power plants at will.

To this end my invention consists in providing a truck of the usual type, including wheels having axles, and a frame supported thereon adapted to receive the car body. Within the frame is yieldingly mounted a second frame, herein referred to as the engine frame, to which the engine and transmission assemblies are bolted. The engine frame is so supported from the body supporting frame that it is capable of up and down movement and also a horizontal movement. The driving connection between the transmission and the wheel axles consists of a chain, so that there is no rigid connection between the wheels and the body supporting frame and the second frame supporting the engine and the transmission assembly.

The invention also comprises a novel arrangement of hydraulic controls, whereby the driver may have selective control of either or both of the power units, and also in the particular arrangement of a reversing unit, whereby the motion of the truck may be in either a forward or a reverse direction, as desired.

The invention further consists of the particular arrangement, structure, and combination of parts herein shown and described.

In the accompanying drawings I have illustrated the invention in its most preferred form, although obviously I do not wish to be limited thereto, as the embodiment illustrated is merely selected to show the principle involved.

In these drawings:—

Fig. 1 is a general plan view of a truck and assembly with parts broken away.

Fig. 2 is a side elevation of the device of Fig. 1 partly in section.

Figure 3:
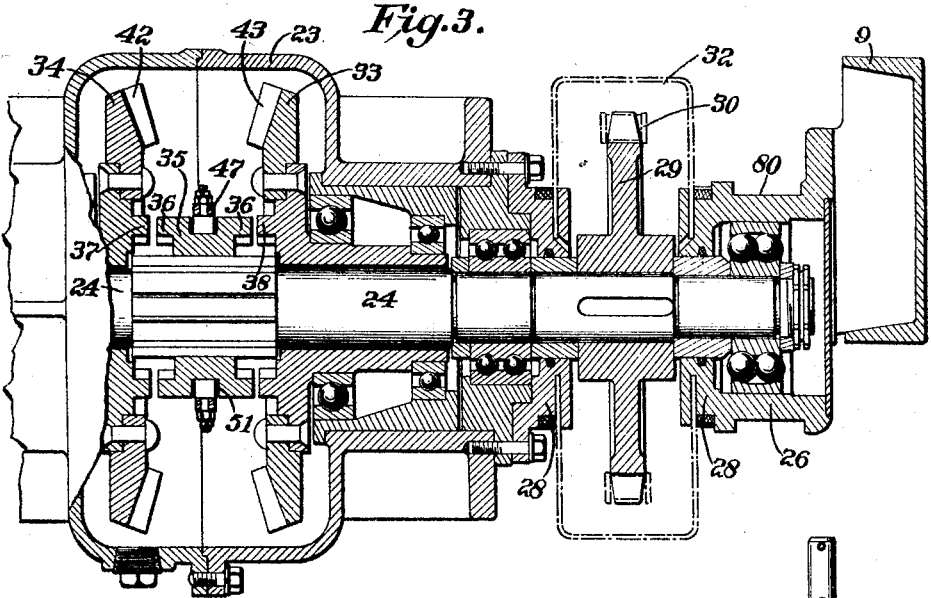
Fig. 3 is an enlarged sectional elevation of the transmission assembly.
Figure 4:
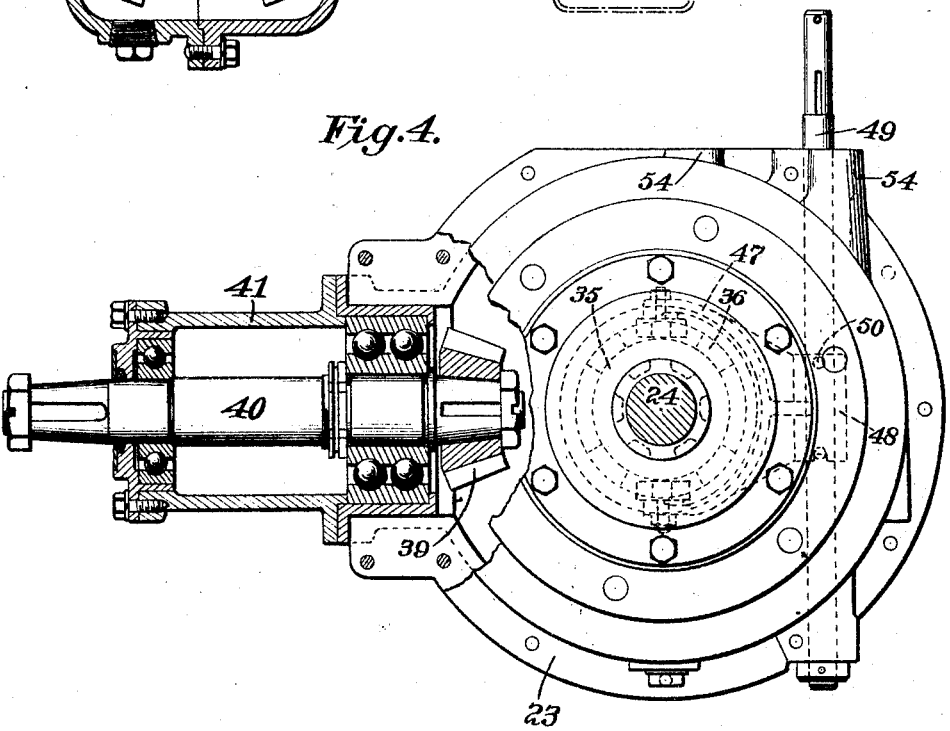
Fig. 4 is an end elevation partly in section of the assembly of Fig. 3.
Figure 5:
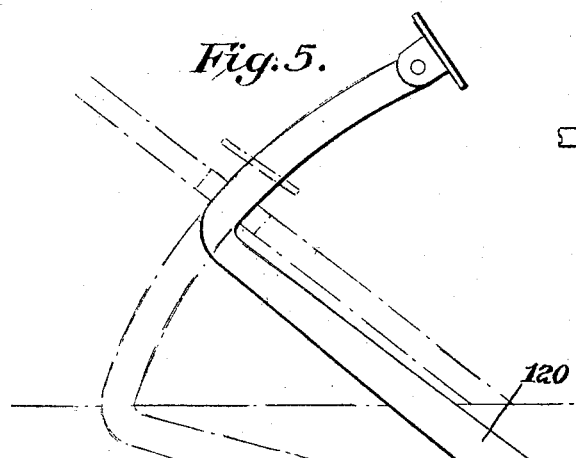
Fig. 5 is a side elevation partly in section of the clutch control mechanism.
Figure 6:
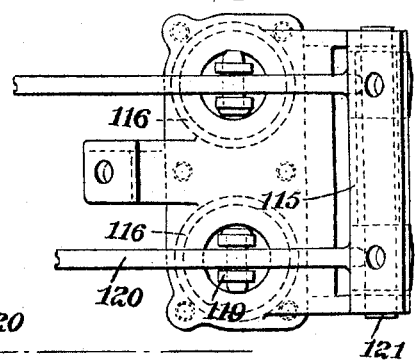
Fig. 6 is a partial plan view of the mechanism of Fig. 5.
Figure 8:
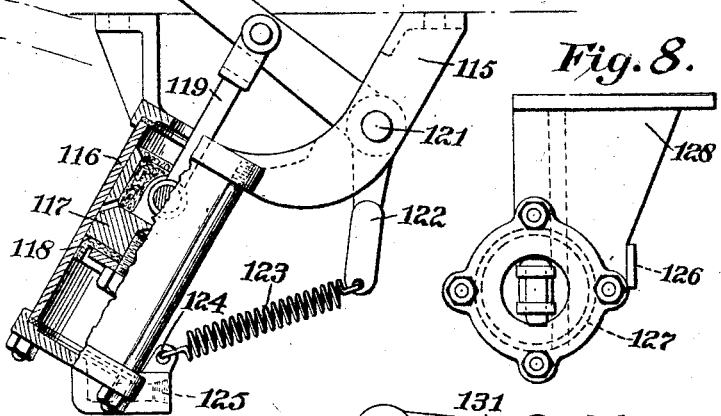
Fig. 8 is a plan view of Fig. 7.
Figure 7:
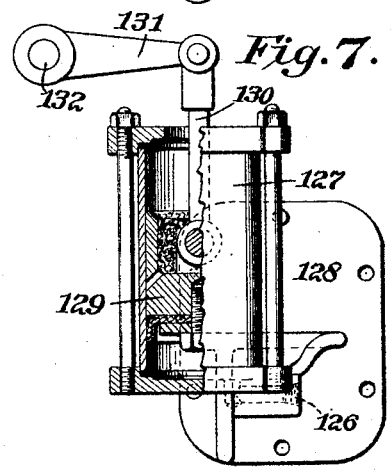
Fig. 7 is a front view of the clutch shaft control partly in section.
Figure 9:
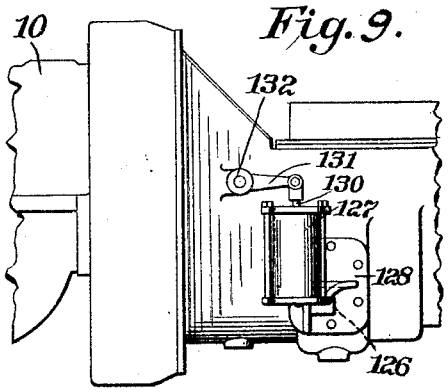
Fig. 9 is a fragmental side view of the engine showing the clutch shaft control mechanism mounted thereon.

I have illustrated at 1 the truck frame, which is the car body supporting frame, and is of substantially ordinary construction, using preferably structural channel sections to form sides and ends suitably braced. Hangers 2 are bolted to the frame 1 and support journal boxes 3 adapted to receive the axles 4 connecting the wheels 5, which in this instance are flanged, as the invention is particularly adapted to replace the steam or electric propelled railway stock.

Upon the truck or body supporting frame 1 I provide a bolster 6 upon which the car body is to rest. The car body may be mounted for pivotal movement in the ordinary manner, where desired. Springs 7 are provided to take the direct shock from the wheels 5 and the spring 8 is associated with the bolster 6 to aid in absorbing shocks which would otherwise be transmitted to the body, and thus serves to resiliently support the body.

A supplemental or engine frame is shown at 9, also consisting of U-beams suitably braced, which supports the engine 10. The engine is preferably bolted as at 18 to the beam 17, which is in turn bolted to the spacing element 16 secured to the frame 9.

The transmission assembly is shown generally at 23 which is secured to intermediate beams 21 which are connected as by corner brackets 22 with stringer 19 between the long sides of the supplemental frame 9 and the end 9ª of said frame.

In mounting the engine frame 9 within the main frame 1 I make use of the leaf springs 11 secured to a bracket or hanger 12, which is attached to the frame 9. The bolts 13 and shackle 14 assist in securing the inner end of the spring 11 to the hanger 12. The spring 11 is attached at its outer end to a link 15 which is in turn pivoted to the frame 1 as at 15ª. It will be seen that the springs 11 extend longitudinally of the structure and are the sole support of the frame 9. In this way any shocks transmitted through the wheels and to the frame 1 are absorbed by the springs 11, thus freeing the engine and the transmission from undue vibration.

The engine 10 is of any standard construction and provided with the usual gearing structure, so that there are preferably four speeds forward. The gear shifting assembly may be ordinary or designed to suit special circumstances.

I have found a convenient transmission to consist of a jack shaft 24 contained within the housing 23 which is mounted in bearings 25 held in the journal box 26 secured to the frame 9. A second bearing 27 also supports the jack shaft 24 and is carried within the housing 23. Oil ring assemblies 28 prevent the escape of oil or lubricant from the bearings, as it is desirable that these parts float in oil. A sprocket 29 is keyed or otherwise secured to the jack shaft 24 and is engaged by a chain 30 passing around the same. Said chain also engages a similar sprocket 31 secured to the axle 4 and thus rotation of the jack shaft causes a similar rotation of the axle. It is desirable to provide a housing 32 for said chain 30 in order that the sprocket may run in oil or other lubricant. Obviously a plurality of such sprockets and chains may be provided. As a matter of fact, I find it desirable to provide two such assemblies.

A radius rod 78 attached to journal assembly 79, which lies in the channel 80 of the bearing housing 26 on the jack shaft, terminates at its other end in a similar bearing 81 on the wheel axle 4 for the purpose of keeping the driving chains tight.

The bearing parts 79 and 81 are so constructed that the shafts passing within them may rotate freely. The radius rod 78 may be adjusted as is usual in these cases. A similar radius rod is provided in proximity to the other driving chain on the other side of the transmission assembly.

Mounted for the free rotation on the jack shaft 24 is a ring gear 33. A similar ring gear 34 is also similarly mounted on the jack shaft 24 opposite to the gear 33 and between the two a splined dog 35 mounted for a limited longitudinal movement on the jack shaft, but held against rotative movement thereon. The splined dog 35 is provided with teeth 36 adapted to mesh with either teeth 37 on the ring gear 34 or teeth 38 on the ring gear 33, as the dog 35 is moved to either the left or the right. A beveled gear 39 mounted on the stub shaft 40 and housed within the casing 41 is adapted to engage the teeth 42 of ring gear 34 and 43 of ring gear 33. The shaft 40 is connected by universal flexible joints 45 to the drive or propeller shaft 46 of the engine 10. It will be apparent that as the beveled gear 39 rotates ring gears 33 and 34 will rotate freely on the jack shaft 24 in opposite directions. When, therefore, the splined dog 35 is moved either to the right or the left to engage with either the ring gear 33 or the ring gear 34, the jack shaft 24 will be caused to rotate in the same direction as the ring gear with which the splined dog is meshed. Any suitable or specially designed controlling device may be used to cause longitudinal movement of the splined dog 35 into selected engagement with either of the ring gears.

The instrumentalities whereby the splined dog 35 may be moved either to the right or to the left on the jack shaft 24 may consist of a yoke 47 terminating in a cylindrical portion 48 adapted to surround the actuating shaft 49. A pin 50 passing through both the elements 48 and 49 causes integral movement between the two. The yoke 47 is adapted to engage the splined dog 35 in a circumferential channel 51. Any desired means may be utilized to actuate the shaft 49.

I contemplate placing the driver's seat at some distance from the clutch mechanism of the engine, and I have therefore designed certain instrumentalities whereby the control of said clutch assembly may be positive, and where two power plants are to be used in the same vehicle said control may be used either selectively or together. Such mechanism may consist of a bracket 115 secured to the floor of the car beneath the driver's seat. This bracket carries a cylinder 116 within which operates a piston 117 having packing 118, said piston being connected by means of connecting rod 119 to a clutch foot pedal 120. Said pedal is pivoted to the bracket 115 as at 121 and is provided with an extension 122 to which a spring 123 is attached. The other end of the spring is secured to an eye 124 in the cylinder assembly, so that when pressure on the clutch pedal 120 is released the spring 123 will retract the parts to their normal position. The lower end of the cylinder 116 is provided with a port 125 which connects with the pipe line attached to a port 126 which connects with a clutch cylinder 127 secured by a bracket 128 to the side of the crank case of the engine. Within the cylinder 127 is provided a piston 129 to which is attached a connecting rod 130 which is connected at its upper end with a link 131 which encircles the clutch shaft 132. This clutch shaft projects through the wall of the crank case and operates in the usual manner to engage and disengage the clutch mechanism within the engine proper.

The cylinders 116 and 127 and the pipe line connecting the two are adapted to be filled with a non-compressible fluid, such as oil, so that when the lever is compressed the displacement of the oil beneath the piston 117 will cause a like displacement in reverse direction of the piston 129 and a partial rotation of the clutch shaft 132. When spring 123 is allowed to act, this will retract the piston 117, which will cause a similar but reverse movement of the piston 117, and the parts will then occupy their normal position.

I contemplate the use of two such clutch assemblies, the clutch pedals being located in the same bracket, but each power plant having its own clutch cylinder at the take-off end of the hydraulic line. These clutch pedals are to be located sufficiently close together so that the operator may, by placing his foot over both, depress them together or selectively, as he desires.

Various mechanisms may be used to control the shifting of the gears.

It will now be apparent that I have devised desirable instrumentalities whereby a vehicle may be driven by a series of power plants or a selective plant, and the other plant or plants cut in as necessity may dictate. It is not necessary that the two motors be accurately synchronized together, as it is common practice to provide two power plants for the same train, such as steam locomotives which are in no way synchronized together.

I have not illustrated the braking system nor the gasoline and spark control nor the details of the engine, as these are ordinary and may be readily designed to suit various circumstances.

I claim:

1. A motor car including a plurality of trucks, each having its own power plant, independent control means for each power plant, including a manually operable lever, the said levers being mounted adjacent each other, whereby the operator may manipulate them simultaneously.

2. A motor car including a plurality of trucks, each having its own power plant, independent and selective control means for each power plant including a foot pedal, said pedals being disposed adjacent each other whereby the operator may manipulate them simultaneously.

3. A motor car including a plurality of trucks, each having its own power plant, and independent and selective control means for each power plant, a car body mounted on said trucks, said control means being located at one end of said car body.

4. A motor car including a truck frame, road engaging wheels carried thereby, a secondary frame resiliently hung from the truck frame, a power plant and transmission mechanism mounted on said secondary frame, and a driving connection between the transmission mechanism and the road engaging wheels.

5. A motor car including a truck frame, road engaging wheels carried thereby, a secondary frame resiliently hung from the truck frame, a power plant and transmission mechanism mounted on said secondary frame, and a driving connection between the transmission mechanism and the road engaging wheels, said resilient connection including leaf springs swung from the under portion of said truck frame.

6. A motor car including a truck frame, road engaging wheels carried thereby, a secondary frame resiliently hung from the truck frame, a power plant and transmission mechanism mounted on said secondary frame, and a driving connection between the transmission mechanism and the road engaging wheels, said secondary frame being capable of vertical and longitudinal movement.

7. A motor car including a truck frame, road engaging wheels carried thereby, a secondary frame resiliently hung from the truck frame, a power plant and transmission mechanism mounted on said secondary frame, and a driving connection between the transmission mechanism and the road engaging wheels, said resilient connection including a leaf spring secured to said secondary frame, the free end of said spring being mounted for pivotal movement.

8. A motor car including a truck frame, road engaging wheels carried thereby, a secondary frame resiliently hung from the truck frame, a power plant and transmission mechanism mounted on said secondary frame, and a driving connection between the transmission mechanism and the road engaging wheels, said resilient connection including a leaf spring secured to the secondary frame, the free end of said spring pivotally engaging a link, said link being pivotally hung from the truck frame.

9. A motor car including a truck having a frame, road engaging wheels carried thereby, a secondary frame resiliently hung from the truck frame, a power plant mounted on said secondary frame, a transmission mechanism for said truck, and a driving connection between the transmission mechanism and the road engaging wheels.

10. A motor car including a truck having a frame, road engaging wheels carried thereby, a secondary frame resiliently carried by the truck frame, a power plant and a transmission mechanism mounted on said secondary frame, and a driving connection between said transmission mechanism and said road engaging wheels.

11. A motor car including a truck having a frame, road engaging wheels carried thereby, a secondary frame resiliently carried by the truck frame, said resilient means including a leaf spring, a power plant mounted on said secondary frame, a transmission mechanism for said truck, and a driving connection between said transmission mechanism and said road engaging wheels.

12. A motor car including a truck having a frame, road engaging wheels carried thereby, a secondary frame resiliently carried by said truck frame, and mounted for longitudinal and vertical movement, a power plant carried by said secondary frame, a transmission mechanism for said truck, and a driving connection between said transmission mechanism and said road engaging wheels.

In testimony whereof, I affix my signature.

HARRY POWELL EDWARDS.